United States Patent
Gotou et al.

(10) Patent No.: US 10,953,876 B2
(45) Date of Patent: Mar. 23, 2021

(54) TARGET VEHICLE SPEED GENERATION METHOD AND TARGET VEHICLE SPEED GENERATION DEVICE FOR DRIVING-ASSISTED VEHICLE

(71) Applicant: Nissan Motor Co., Ltd., Kanagawa (JP)

(72) Inventors: Akinobu Gotou, Kanagawa (JP); Takashi Fukushige, Kanagawa (JP); Satoshi Tange, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/617,001

(22) PCT Filed: Jul. 3, 2017

(86) PCT No.: PCT/JP2017/024400
§ 371 (c)(1),
(2) Date: Nov. 26, 2019

(87) PCT Pub. No.: WO2019/008648
PCT Pub. Date: Jan. 10, 2019

(65) Prior Publication Data
US 2020/0391737 A1    Dec. 17, 2020

(51) Int. Cl.
*B60W 30/14* (2006.01)
*B60W 30/16* (2020.01)
*B60W 40/04* (2006.01)

(52) U.S. Cl.
CPC .......... *B60W 30/143* (2013.01); *B60W 30/16* (2013.01); *B60W 40/04* (2013.01);
(Continued)

(58) Field of Classification Search
None
See application file for complete search history.

(56) References Cited

U.S. PATENT DOCUMENTS

| 2015/0112580 A1 | 4/2015 | Sudou et al. |
| 2015/0210279 A1 | 7/2015 | Agnew et al. |

(Continued)

FOREIGN PATENT DOCUMENTS

| CN | 1926003 A | 3/2007 |
| CN | 102275579 A | 12/2011 |

(Continued)

*Primary Examiner* — David P Merlino
(74) *Attorney, Agent, or Firm* — Global IP Counselors, LLP (57) ABSTRACT

A target vehicle speed generation device includes a controller that includes a target travel route generation unit, a peripheral object information acquisition unit, and a target vehicle speed generation unit. The target travel route generation unit generates a target travel route of the vehicle. The peripheral object information acquisition unit acquires position information pertaining to an obstacle on a travel path of the vehicle, and position information pertaining to an obstacle that is located toward the side and is outside of the travel path of the vehicle. The target vehicle speed generation unit calculates a plurality of lateral deviations to the obstacle with respect to the target travel route, and generates a lower target vehicle speed for an obstacle having a lesser lateral deviation than for an obstacle having a greater lateral deviation.

10 Claims, 9 Drawing Sheets

(52) U.S. Cl.
CPC .......... *B60W 2554/406* (2020.02); *B60W 2554/4041* (2020.02); *B60W 2554/801* (2020.02)

(56) References Cited

U.S. PATENT DOCUMENTS

| | | | |
|---|---|---|---|
| 2015/0291159 A1* | 10/2015 | Sasabuchi | B60W 30/0953 |
| | | | 701/1 |
| 2016/0339912 A1 | 11/2016 | Nakade | |
| 2017/0039855 A1* | 2/2017 | Maeda | B60W 30/09 |
| 2018/0345956 A1* | 12/2018 | Ohmura | B60W 30/09 |
| 2019/0039591 A1* | 2/2019 | Raveendran | B60W 30/0953 |
| 2019/0256086 A1* | 8/2019 | Ohmura | B60W 10/20 |

FOREIGN PATENT DOCUMENTS

| | | | |
|---|---|---|---|
| CN | 104080681 A | | 10/2014 |
| CN | 104575101 A | | 4/2015 |
| JP | 2010-72973 A | | 4/2010 |
| JP | 2013109705 A | * | 6/2013 |
| JP | 2013-184563 A | | 9/2013 |
| JP | 2016-215979 A | | 12/2016 |
| JP | 2017-77829 A | | 4/2017 |
| JP | 2019-26208 A | | 2/2019 |

\* cited by examiner

TARGET VEHICLE SPEED GENERATION METHOD AND TARGET VEHICLE SPEED GENERATION DEVICE FOR DRIVING-ASSISTED VEHICLE

CROSS-REFERENCE TO RELATED APPLICATIONS

This application is a U.S. national stage application of International Application No. PCT/JP2017/024400, filed on Jul. 3, 2017.

BACKGROUND

Technical Field

The present disclosure relates to a method and a device for generating a target vehicle speed of a driving-assisted vehicle, in which a target vehicle speed of a host vehicle is generated in accordance with an obstacle that hinders travel of the host vehicle.

Background Information

There are known in the prior art devices for controlling travel of a vehicle in which a target vehicle speed is generated based on a remaining road width in consideration of an obstacle on a travel path of a host vehicle (see, e.g., Japanese Laid-Open Patent Application No. 2013-184563).

SUMMARY

However, with the prior art devices, consideration is given only to obstacles on a travel path of a host vehicle, and not to obstacles (walls, etc.) that are located toward the side and are outside of the travel path of the host vehicle. Therefore, when a remaining road width due to an obstacle on the travel path of the host vehicle is the same irrespective of whether or not an obstacle is present toward the side of the travel path of the host vehicle, a vehicle speed plan derived from a target vehicle speed that is reduced in the same manner irrespective of whether or not an obstacle is present toward the side of the travel path of the host vehicle is formulated. Thus, a problem is presented in that: when an obstacle is present toward the side of the travel path of the host vehicle, a passenger will unnaturally feel that a wall located toward the side seems to be approaching; and when no obstacle is present toward the side of the travel path of the host vehicle, the passenger will feel that travel is undesirably slow on a road where no obstacle is present.

The present disclosure was contrived in view of the problem described above, it being an object of the present disclosure to prevent a passenger from having unpleasant sensations irrespective of whether or not an obstacle is present toward the side of a travel path of a host vehicle during driving-assisted travel.

In order to achieve the above objective, the present disclosure proposes a method for generating a target vehicle speed of a driving-assisted vehicle, in which a target vehicle speed of a host vehicle is generated in accordance with an obstacle that hinders travel of the host vehicle. A target travel route of the host vehicle is generated. Position information pertaining to an obstacle on a travel path of the host vehicle, and position information pertaining to an obstacle that is located toward the side and is outside of the travel path of the host vehicle, are acquired. A lateral deviation to the obstacle on the travel path of the host vehicle with respect to the target travel route, and a lateral deviation to the obstacle that is outside of the travel path of the host vehicle with respect to the target travel route, are calculated, and a lower target vehicle speed is generated for an obstacle having a lesser lateral deviation than for an obstacle having a greater lateral deviation.

Formulating a vehicle speed plan in consideration of not only an obstacle on a travel path of a host vehicle but also an obstacle that is located toward the side and is outside of the travel path of the host vehicle, as described above, makes it possible to prevent a passenger from having unpleasant sensations irrespective of whether or not an obstacle is present toward the side of the travel path of the host vehicle during travel with driving assistance.

DETAILED DESCRIPTION OF THE EMBODIMENTS

A preferred embodiment for implementing a method and device for generating a target vehicle speed of a driving-assisted vehicle according to the present disclosure will be described below based on the first embodiment illustrated in the drawings.

First Embodiment

First, a configuration will be described. The method and device for generating a target vehicle speed of a driving-assisted vehicle in the first embodiment are applied to an autonomous driving vehicle (one example of a driving-assisted vehicle) in which generated target vehicle speed information is used in speed control and steering/drive/braking are autonomously controlled through selection of an autonomous driving mode. The configuration in the first embodiment is described below, and specifically is divided into "Overall system configuration," "Detailed configuration of target vehicle speed generation unit," "Configuration of speed control process," and "Configuration of virtual-distance calculation process."

Overall System Configuration

Figure 1:
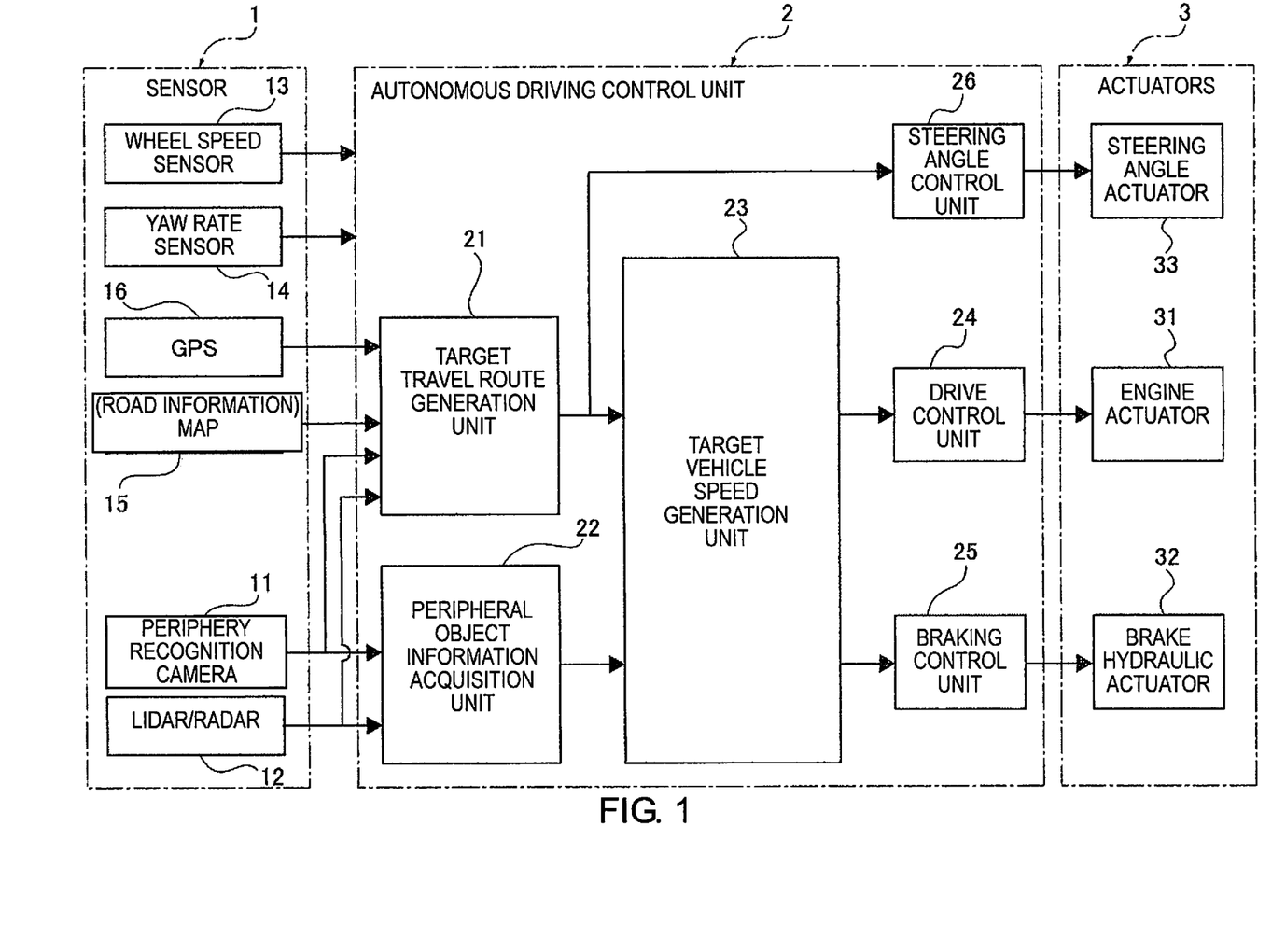
FIG. 1 is an overall system diagram illustrating an autonomous driving control system to which a method and device for generating a target vehicle speed in the first embodiment have been applied.

FIG. 1 is an overall system diagram illustrating an autonomous driving control system to which the method and device for generating a target vehicle speed in the first embodiment have been applied. The overall system configuration is described below with reference to FIG. 1.

As illustrated in FIG. 1, the autonomous driving control system comprises sensors 1, an autonomous driving control unit 2, and actuators 3. The autonomous driving control unit 2 is a computer that comprises a CPU or other processing unit and executes arithmetic processing.

The sensors 1 include a periphery recognition camera 11, lidar/radar 12, wheel speed sensors 13, a yaw rate sensor 14, a map 15, and a GPS 16.

The periphery recognition camera 11 is, e.g., an onboard imaging device comprising a CCD or other imaging element, the periphery recognition camera 11 being installed at a prescribed position on a host vehicle and capturing images of objects in the periphery of the host vehicle. The periphery recognition camera 11 detects obstacles on a travel path of the host vehicle, obstacles that are outside of the travel path of the host vehicle (road structures, preceding vehicles, following vehicles, oncoming vehicles, peripheral vehicles, pedestrians, bicycles, and motorcycles), the travel path of the host vehicle (white road lines, road boundaries, stop lines, pedestrian crossings), road signs (vehicle speed limits), etc. A plurality of vehicle-mounted cameras may be combined to form the periphery recognition camera 11.

The lidar/radar 12 is a ranging sensor, and any form of ranging sensor that is known at the time of application, such as a laser radar, a millimeter wave radar, an ultrasonic radar, or a laser range finder, can be employed therefor. The lidar/radar 12 detects obstacles on the travel path of the host vehicle, obstacles that are outside of the travel path of the host vehicle (road structures, preceding vehicles, following vehicles, oncoming vehicles, peripheral vehicles, pedestrians, bicycles, and motorcycles), etc. If a viewing angle is insufficient, the vehicle may be equipped with a plurality of units. A lidar (ranging sensor that emits light) and a radar (ranging sensor that emits electromagnetic waves) may also be combined.

A wheel speed sensor 13 is provided to each of four wheels. The wheel speed sensors 13 detect a wheel speed of each wheel. An average value of the wheel speeds of left and right driven wheels is used as a detected value of the vehicle speed at a present point in time.

The yaw rate sensor 14 is an attitude sensor that detects a yaw rate of the vehicle (an angular velocity of rotation about a vertical axis passing through a center of gravity of the vehicle). Attitude sensors encompass gyroscope sensors, which can detect a pitch angle, a yaw angle, and a roll angle of a vehicle.

The map 15 is a so-called digital map, and is information that associates latitude/longitude and map information. The map 15 includes road information that has been associated with respective points. The road information is defined by nodes and links that connect nodes together. The road information includes information that specifies roads according to road position/area, and information indicating a type of each road, a width of each road, and road geometry. The position of intersections, the directions of approach of intersections, intersection type, and other information relating to intersections is stored in association with respective identification information for each road link in the road information. Road type, road width, road geometry, whether forward progress is permitted, right-of-way relationships, whether passing is permitted (whether entering an adjacent lane is permitted), vehicle speed limit, and other information relating to roads is also stored in association with respective identification information for each road link in the road information.

The GPS 16 (short for "global positioning system") detects a travel position (latitude and longitude) of the host vehicle during travel.

The autonomous driving control unit 2 comprises a target travel route generation unit 21, a peripheral object information acquisition unit 22, a target vehicle speed generation unit 23, a drive control unit 24, a braking control unit 25, and a steering angle control unit 26.

The target travel route generation unit 21 receives information from the periphery recognition camera 11, the lidar/radar 12, the map 15, and the GPS 16 as input and generates a target travel route for the host vehicle.

The peripheral object information acquisition unit 22 receives information from the periphery recognition camera 11 and the lidar/radar 12 as input and acquires position information about an obstacle on the travel route of the host vehicle and position information about an obstacle that is outside of the travel route of the host vehicle.

The target vehicle speed generation unit 23 receives target travel route information from the target travel route generation unit 21 and peripheral object position information from the peripheral object information acquisition unit 22 as inputs and generates a target vehicle speed of the host vehicle. In the "target vehicle speed generation unit 23," a lateral deviation to the obstacle on the travel path of the host vehicle with respect to the target travel route is calculated, a lateral deviation to the obstacle that is outside of the travel path of the host vehicle with respect to the target travel route is also calculated, and a lower speed is generated for an obstacle having a lesser lateral deviation than for an obstacle having a greater lateral deviation.

The drive control unit 24 receives the target vehicle speed from the target vehicle speed generation unit 23 as input, derives a drive control command value according to a speed servo control, and outputs a derivation result to an engine actuator 31.

The braking control unit 25 receives the target vehicle speed from the target vehicle speed generation unit 23 as input, derives a braking control command value according to the speed servo control, and outputs a derivation result to a brake hydraulic actuator 32.

As a method of deriving a control command value using vehicle speed servo control, for example, feedforward control plus feedback control, which combines feedforward control that corresponds to the value or rate of change of target vehicle speeds and feedback control that corresponds to a difference between the target vehicle speed and the current vehicle speed, is performed. Deviation from a target value due to road gradients or the like should also be taken into account when this is performed.

The steering angle control unit 26 receives the target travel route information from the target travel route generation unit 21 as input and determines a target steering angle so that the host vehicle follows the target travel route of the host vehicle. The steering angle control unit 26 also derives a steering angle control command value so that an actual steering angle matches the target steering angle, and outputs a result of this derivation to a steering angle actuator 33.

The actuators 3 include the engine actuator 31, the brake hydraulic actuator 32, and the steering angle actuator 33.

The engine actuator 31 is an actuator that receives the drive control command value from the drive control unit 24 as input and controls engine drive force. In the case of a hybrid vehicle, an engine actuator and a motor actuator may be used together. In the case of an electric autonomous vehicle, a motor actuator may be used.

The brake hydraulic actuator 32 is a hydraulic booster that receives the braking control command value from the braking control unit 25 as input and controls brake hydraulic braking force. In the case of an electric-powered vehicle not equipped with a hydraulic booster, an electric-powered booster may be used.

The steering angle actuator 33 is a steering angle control motor that receives the steering angle control command value from the steering angle control unit 26 as input and controls a steering angle of a steering wheel.

Detailed Configuration of Target Vehicle Speed Generation Unit

Figure 2:
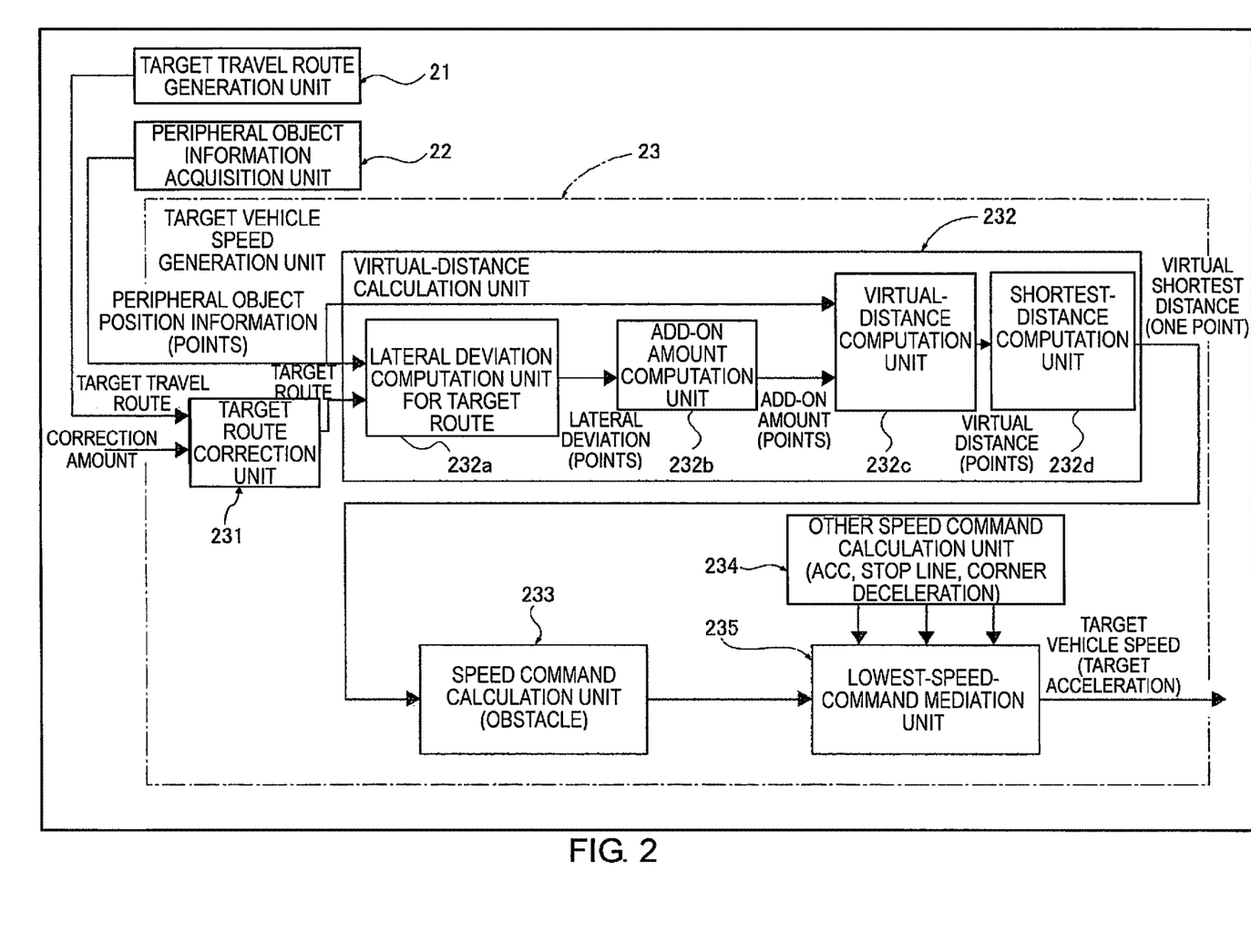
FIG. 2 is a block diagram illustrating a detailed configuration of a target vehicle speed generation unit in the method and device for generating a target vehicle speed in the first embodiment.

FIG. 2 shows a detailed configuration of the target vehicle speed generation unit 23 in the device for generating a target vehicle speed in the first embodiment. Detailed configuration of the target vehicle speed generation unit 23 provided to the autonomous driving control unit 2 will be described below with reference to FIG. 2.

The target vehicle speed generation unit 23 comprises a target route correction unit 231, a virtual-distance calculation unit 232, a speed command calculation unit 233, another speed command calculation unit 234, and a lowest-speed-command mediation unit 235, as shown in FIG. 2.

The target route correction unit 231 receives the target travel route and a correction amount from the target travel route generation unit 21 as inputs and generates a target route in which the target travel route is corrected using the correction amount. The "target route" is used as target travel route information during computation of a virtual shortest distance (one point) by the virtual-distance calculation unit 232.

The virtual-distance calculation unit 232 has a lateral deviation computation unit 232a for computing lateral deviation of the target route, an add-on amount computation unit 232b, a virtual-distance computation unit 232c, and a shortest-distance computation unit 232d.

The lateral deviation computation unit 232a receives the peripheral object position information (points) from the peripheral object information acquisition unit 22 and the target route from the target route correction unit 231 as inputs and computes a lateral deviation between the target route and an obstacle.

The add-on amount computation unit 232b receives the lateral deviation (points) from the lateral deviation computation unit 232a as input and computes an add-on amount for a frontward distance in accordance with the lateral deviation.

The virtual-distance computation unit 232c receives the peripheral object position information (points) from the peripheral object information acquisition unit 22 and the add-on amount (points) from the add-on amount computation unit 232b as inputs and adds the add-on amount to an actual distance between the host vehicle and the obstacle to compute a virtual distance.

The shortest-distance computation unit 232d receives the virtual distance (points) from the virtual-distance computation unit 232c as input, selects an obstacle for which the virtual distance is the smallest, and computes a virtual shortest distance (one point).

The speed command calculation unit 233 receives the virtual shortest distance (one point) from the shortest-distance computation unit 232d of the virtual-distance calculation unit 232, creates a speed profile corresponding to the obstacle based on the virtual shortest distance, and calculates a speed command value (obstacle) according to the created speed profile.

The other speed command calculation unit 234 calculates a speed command value of a different type than that calculated by the speed command calculation unit 233 (obstacle). For example, the other speed command calculation unit 234 creates a speed profile corresponding to adaptive cruise control (ACC) based on the ACC and calculates a speed command value (ACC) according to the created speed profile. As another example, the other speed command calculation unit 234 creates a speed profile corresponding to a stop line based on a stop line in front of the host vehicle and calculates a speed command value (stop line) according to the created speed profile. As yet another example, the other speed command calculation unit 234 creates a speed profile corresponding to corner deceleration based on a tight corner in front of the host vehicle and calculates a speed command value (corner deceleration) according to the created speed profile.

The lowest-speed-command mediation unit 235 selects, as a target vehicle speed, the lowest value from among a plurality of speed command values calculated by the speed command calculation unit 233 and the other speed command calculation unit 234. In addition to selecting the lowest value as the target vehicle speed, the lowest-speed-command mediation unit 235 simultaneously selects an acceleration/deceleration limitation amount that corresponds to the type of the selected target vehicle speed. Specifically, when the speed command value calculated by the speed command calculation unit 233 (obstacle) is selected by the lowest-speed-command mediation unit 235, the target vehicle speed (obstacle) is generated based on the virtual shortest distance (one point).

When the lowest-speed-command mediation unit 235 has selected the speed command value calculated by the speed command calculation unit 233 (obstacle) as the lowest value, the target vehicle speed (obstacle) is generated as described in (a), (b), and (c) below.

(a) In relation to an obstacle for which the lateral deviation with respect to the target travel route is equal to or less than a prescribed value, a target vehicle speed (obstacle) is generated according to a speed profile that stops immediately before the obstacle.

(b) An extent of adjustment of the target vehicle speed (obstacle) that corresponds to the lateral deviation from the target travel route is changed according to the frontward distance between the host vehicle and the obstacle. Specifically, the target vehicle speed (obstacle) decreases as the frontward distance between the host vehicle and the obstacle decreases to a greater extent than in the case of a target vehicle speed (obstacle) when the frontward distance between the host vehicle and the obstacle is increasing.

(c) The extent of adjustment of the target vehicle speed (obstacle) that corresponds to the lateral deviation from the target travel route is changed in accordance with a vehicle speed limit of the road. Specifically, in the case of obstacles having the same lateral deviation, the target vehicle speed (obstacle) when the road has a high vehicle speed limit is greater than the target vehicle speed (obstacle) when the road has a low vehicle speed limit.

Configuration of Speed Control Process

Figure 3:
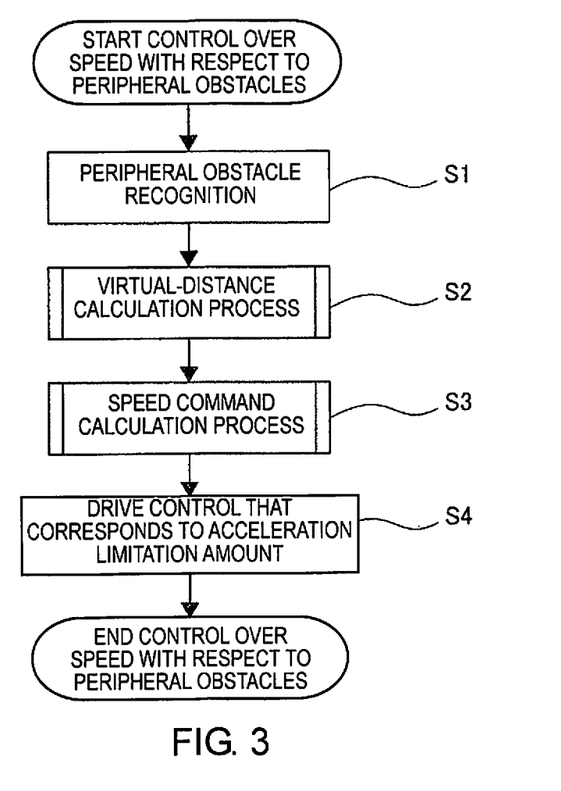
FIG. 3 is a flowchart illustrating a flow of a vehicle speed control process in which a target vehicle speed is used, the vehicle speed control process being executed by an autonomous driving control unit in the first embodiment.
Figure 4:
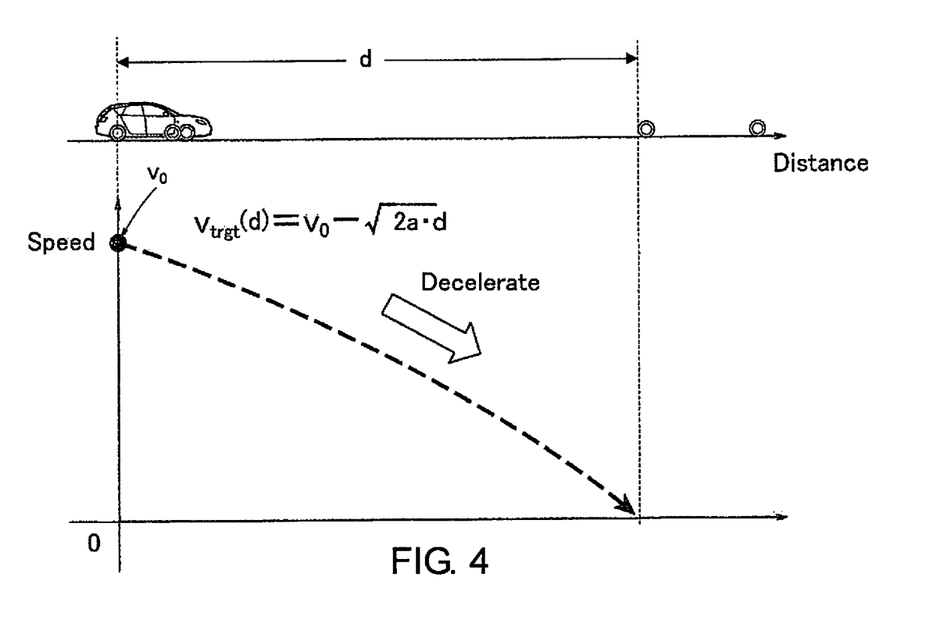
FIG. 4 is a speed profile characteristic diagram illustrating a flow of a virtual-distance calculation process in step S2 of the flowchart shown in FIG. 3.

FIG. 3 shows a flow of a speed control process in which the target vehicle speed (obstacle) is used, the speed control process being executed by the autonomous driving control unit 2 in the first embodiment. FIG. 4 shows a speed profile generated through a speed command calculation process in step S3 of the flowchart shown in FIG. 3. A configuration of a speed control process in which the target vehicle speed (obstacle) is used is described below based on FIGS. 3 and 4.

The steps shown in FIG. 3 are described first. Upon the initiating of a control over speed with respect to peripheral obstacles, a peripheral obstacle is recognized in step S1, and the process advances to step S2. In step S2, a virtual-distance calculation process (FIGS. 5 to 7) (described below) is executed based on the recognition of the peripheral obstacle, and the process advances to step S3. In step S3, a speed command calculation process is executed based on a virtual shortest distance (one point) acquired in the virtual-distance calculation process, and the process advances to step S4. In step S4, a drive control that corresponds to an acceleration limitation amount is executed based on the target vehicle speed (obstacle) acquired in the speed command calculation process, and the control over speed with respect to peripheral obstacles is ended.

In the speed command calculation process of step S3, a speed profile (i.e., target vehicle speed profile) representing a change in the target vehicle speed (obstacle) when reduced at a fixed deceleration α is created based on a deceleration initiation speed $v_0$ and a virtual shortest distance d, as shown in FIG. 4.

The speed profile $v_{trgt}(d)$ is represented by the following formula:

$$v_{trgt}(d) = v_0 - \sqrt{2\alpha \cdot d}$$

In this case, the fixed deceleration a is set as a target acceleration. A drive control based on the target vehicle speed (obstacle) is executed so as to obtain a target deceleration determined according to the target acceleration and the acceleration limitation amount.

Configuration of Virtual Distance Calculation Process

Figure 5:
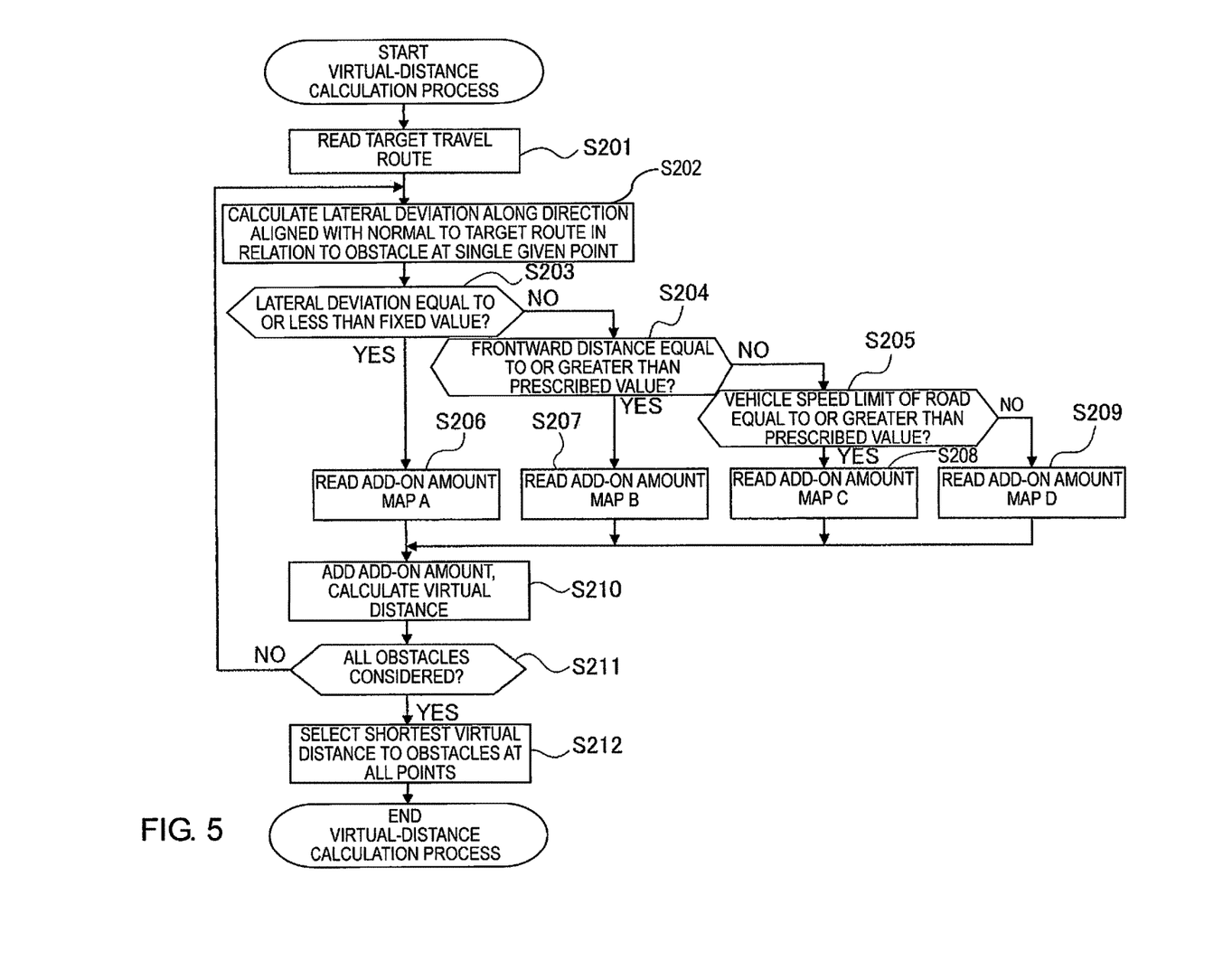
FIG. 5 is a flowchart illustrating a vehicle speed profile generated through a vehicle speed command calculation process in step S3 of the flowchart shown in FIG. 3.
Figure 6:
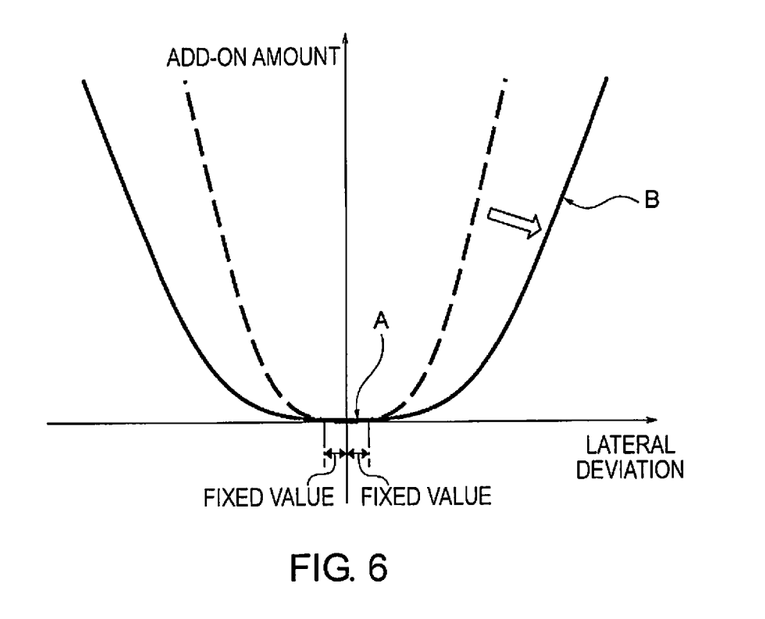
FIG. 6 is a map diagram illustrating one example of an add-on amount map A and an add-on amount map B used in the virtual-distance calculation process.
Figure 7:
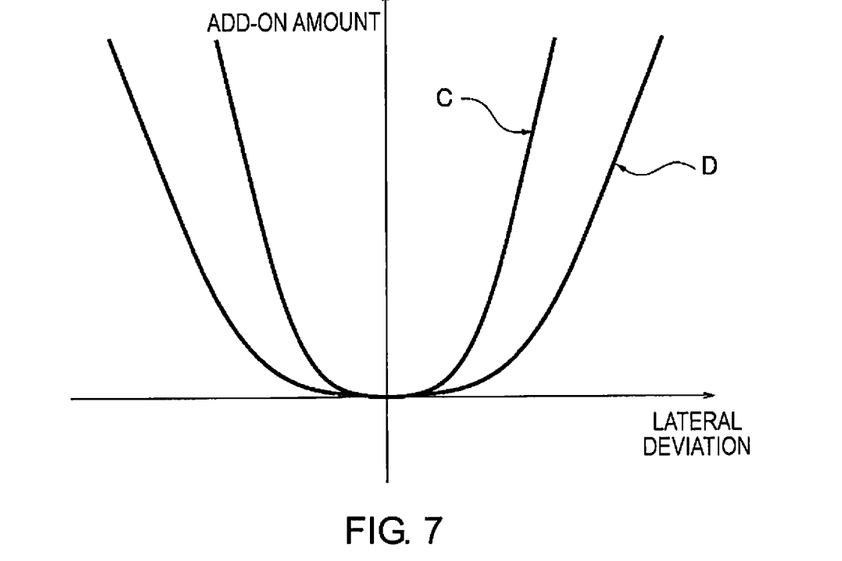
FIG. 7 is a map diagram illustrating one example of an add-on amount map C and an add-on amount map D used in the virtual-distance calculation process.

FIG. 5 shows a flow of the virtual-distance calculation process in step S2 of the flowchart shown in FIG. 3. FIGS. 6 and 7 show add-on amount maps used in the virtual-distance calculation process. The configuration of the virtual-distance calculation process (configuration of the process in the virtual-distance calculation unit 232 of FIG. 2) is described below based on FIGS. 5 to 7. First, steps in FIG. 5 are described.

In step S201, following from initiation of the virtual-distance calculation process, the target travel route is read, and the process advances to step S202.

In step S202, following from the reading in step S201 of the target travel route, or following from an assessment in step S211 that not all obstacles have been considered, a lateral deviation along a direction aligned with a normal to the target route is calculated in relation to an obstacle at a single given point, and the process advances to step S203.

In step S203, following from the calculation in step S202 of the lateral deviation, an assessment is made as to whether or not the lateral deviation is equal to or less than a fixed value. If YES (lateral deviation is equal to or less than fixed value), the process advances to step S206; if NO (lateral deviation is greater than fixed value), the process advances to step S204.

In step S204, following from the assessment in step S203 that the lateral deviation is greater than the fixed value, an assessment is made as to whether or not the frontward distance to the obstacle is equal to or greater than a prescribed value. If YES (frontward distance is equal to or greater than prescribed value), the process advances to step S207; if NO (frontward distance is less than prescribed value), the process advances to step S205.

In step S205, following from the assessment in step S204 that the frontward distance is less than the prescribed value, an assessment is made as to whether or not the vehicle speed limit of the road on which the host vehicle is traveling is equal to or greater than a prescribed value. If YES (vehicle speed limit of road is equal to or greater than prescribed value), the process advances to step S208; if NO (vehicle speed limit of road is less than prescribed value), the process advances to step S209.

In step S206, following from the assessment in step S203 that the lateral deviation is equal to or less than the fixed value, the add-on amount map A is read, an add-on amount is set to zero, and the process advances to step S210. The "add-on amount map A" is such that an add-on amount of zero is used when the lateral deviation is equal to or less than the fixed value, as shown in FIG. 6.

In step S207, following from the assessment in step S204 that the frontward distance is equal to or greater than the prescribed value, the add-on amount map B is read, the add-on amount is increased correspondingly with an increase in the lateral deviation, and the process advances to step S210. Because sensor resolution is low when the frontward distance is equal to or greater than the prescribed value, the "add-on amount map B" is applied according to a characteristic of sensitivity below that in the add-on amount map A (characteristic shown by dashed lines), as shown in FIG. 6, the add-on amount map A pertaining to instances when the frontward distance is less than the prescribed value.

In step S208, following from the assessment in step S205 that the vehicle speed limit of the road is equal to or greater than the prescribed value, the add-on amount map C is read, the add-on amount is increased correspondingly to an increase in the lateral deviation, and the process advances to step S210. The "add-on amount map C" is applied according to a characteristic of sensitivity higher than that in an add-on amount map D (characteristic of a greater add-on amount for the same lateral deviation), as shown in FIG. 7, the add-on amount map D being selected in metropolitan areas, etc. This is due to the necessity of suppressing sudden deceleration as much as possible in the case of a high-speed road, etc., where the vehicle speed limit of the road is equal to or greater than the prescribed value.

In step S209, following from the assessment in step S205 that the vehicle speed limit of the road is less than the prescribed value, the add-on amount map D is read, the add-on amount is increased correspondingly to an increase in the lateral deviation, and the process advances to step S210. The "add-on amount map D" is applied according to a characteristic of lower sensitivity than that in the add-on amount map C (characteristic of a reduced add-on amount for the same lateral deviation), as shown in FIG. 7, the add-on amount map C being selected in the case of high-speed roads, etc. This is due to the prioritization of obstacle avoidance in the case of metropolitan areas, etc., where the vehicle speed limit of the road is less than the prescribed value.

In step S210, following from the computation in step S206, step S207, step S208, or step S209 of the add-on amount, the virtual distance is calculated by adding the add-on amount to the frontward distance from the host vehicle to the obstacle, and the process advances to step S211.

In step S211, following from the calculation in step S210 of the virtual distance, an assessment is made as to whether or not all obstacles have been considered. If YES (all obstacles have been considered), the process advances to step S212; if NO (not all obstacles have been considered), the process returns to step S202.

In step S212, following from the assessment in step S211 that all obstacles have been considered, the shortest of all obstacle virtual distances is selected, and the virtual-distance calculation process is ended.

Thus, the add-on amount is computed in the following manner by the add-on amount computation unit 232b of the virtual-distance calculation unit 232 in FIG. 2.

(a) When the lateral deviation between the target travel route and the obstacle is equal to or less than an upper bound value, the add-on amount is set to zero.

(b) The add-on amount is changed in accordance with the vehicle speed limit of the road. The add-on amount is increased on roads where the vehicle speed limit is high, and is reduced on roads where the vehicle speed limit is low.

(c) The add-on amount is changed in accordance with the frontward distance from the host vehicle. The add-on amount is reduced when the obstacle is at a short distance from the host vehicle. The add-on amount is increased as the frontward distance between the host vehicle and the obstacle increases.

The operation of the invention is described next. The operation in the first embodiment is described below, and specifically is divided into "Operation for generating target vehicle speed in a comparative example," "Operation of process for generating a target vehicle speed," "Operation for controlling speed when host vehicle is traveling sufficiently far away from obstacle located toward the side," and "Operation for controlling speed when host vehicle is traveling near obstacle located toward the side."

Operation for Generating Target Vehicle Speed in Comparative Example

Figure 8:
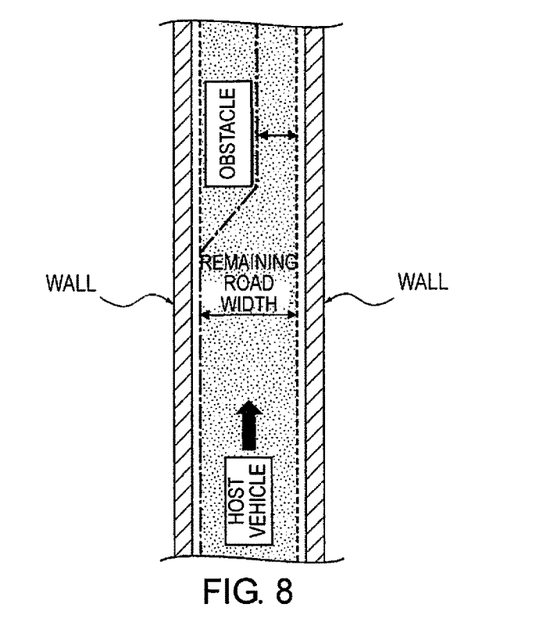
FIG. 8 is an operation schematic diagram illustrating a speed control operation when an obstacle is present in front of a travel path of a host vehicle and a wall (obstacle) is present toward the side of the travel path of the host vehicle in a comparative example.
Figure 9:
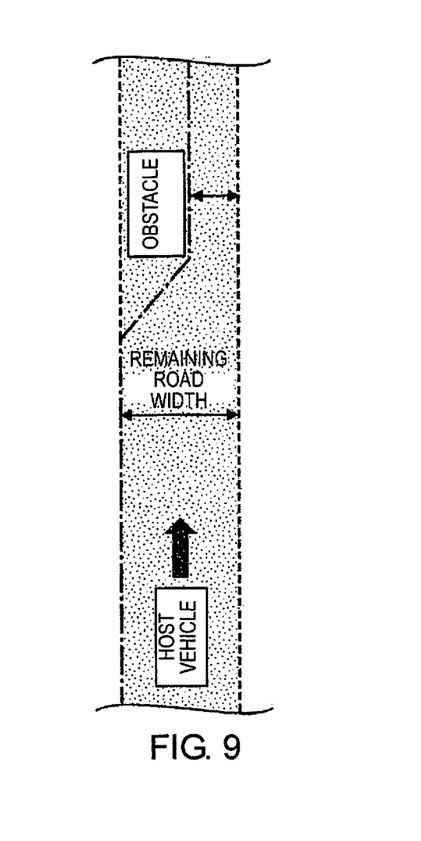
FIG. 9 is an operation schematic diagram illustrating a speed control operation when an obstacle is present in front of a travel path of a host vehicle and no wall (obstacle) is present toward the side of the travel path of the host vehicle in a comparative example.

FIG. 8 shows a speed control operation when an obstacle is present in front of a travel path of a host vehicle and a wall (obstacle) is present toward the side of the travel path of the host vehicle in a comparative example. FIG. 9 shows a speed control operation when an obstacle is present in front of a travel path of a host vehicle and no wall (obstacle) is present toward the side of the travel path of the host vehicle in a comparative example. An operation for generating a target vehicle speed in a comparative example is described below based on FIGS. 8 and 9.

First, in the comparative example, a vehicle speed plan is formulated according to a target vehicle speed based on a remaining road width in consideration of only obstacles on a travel path of a host vehicle.

In the comparative example, consideration is given only to obstacles (stopped vehicles, etc.) on a travel path of a host vehicle, and walls (obstacles) that are located toward the side and are outside of the travel path of the host vehicle are completely ignored. Therefore, when a remaining road width due to an obstacle on the travel path of the host vehicle is the same, a vehicle speed plan derived from a target vehicle speed that is reduced in the same manner irrespective of whether or not a wall (obstacle) is present toward the side of the travel path of the host vehicle is formulated.

Therefore, when walls are present on both sides of the travel path of the host vehicle, as shown in FIG. 8, deceleration of the host vehicle is insufficient and a speed higher than the speed intended by a passenger is reached, irrespective of the presence of the walls on both sides of the travel path of the host vehicle. Therefore, when the host vehicle passes along a road where walls are present on both sides, the passenger in the host vehicle will unnaturally feel that the walls located toward the side seem to be approaching.

Conversely, when no walls are present toward the two sides of the travel path of the host vehicle, as shown in FIG. 9, deceleration of the host vehicle is excessive and a speed lower than the speed intended by the passenger is reached, irrespective of the absence of walls toward the two sides of the travel path of the host vehicle. Therefore, when the host vehicle passes along a road where no obstacle is present, the passenger in the host vehicle will feel that travel is undesirably slow.

In the case of a driving-assisted vehicle such as an autonomous driving vehicle, the "discomfort that the walls located toward the side seem to be approaching" and the "feeling that travel is undesirably slow" are unpleasant sensations because they are not intended by any passenger, including the driver, rather than being caused by manipulation of the accelerator or the brake by the driver.

In the case of the comparative example that is based on the remaining road width and considers only obstacles present on the travel path, if the road is wide but an obstacle is present toward the side, a passenger will unnaturally feel that the obstacle located toward the side seems to be approaching. Moreover, if the road is narrow but no obstacle is present toward the side, the passenger will feel that travel is undesirably slow due to deceleration beyond what is necessary.

Operation of Process for Generating a Target Vehicle Speed

Figure 10:
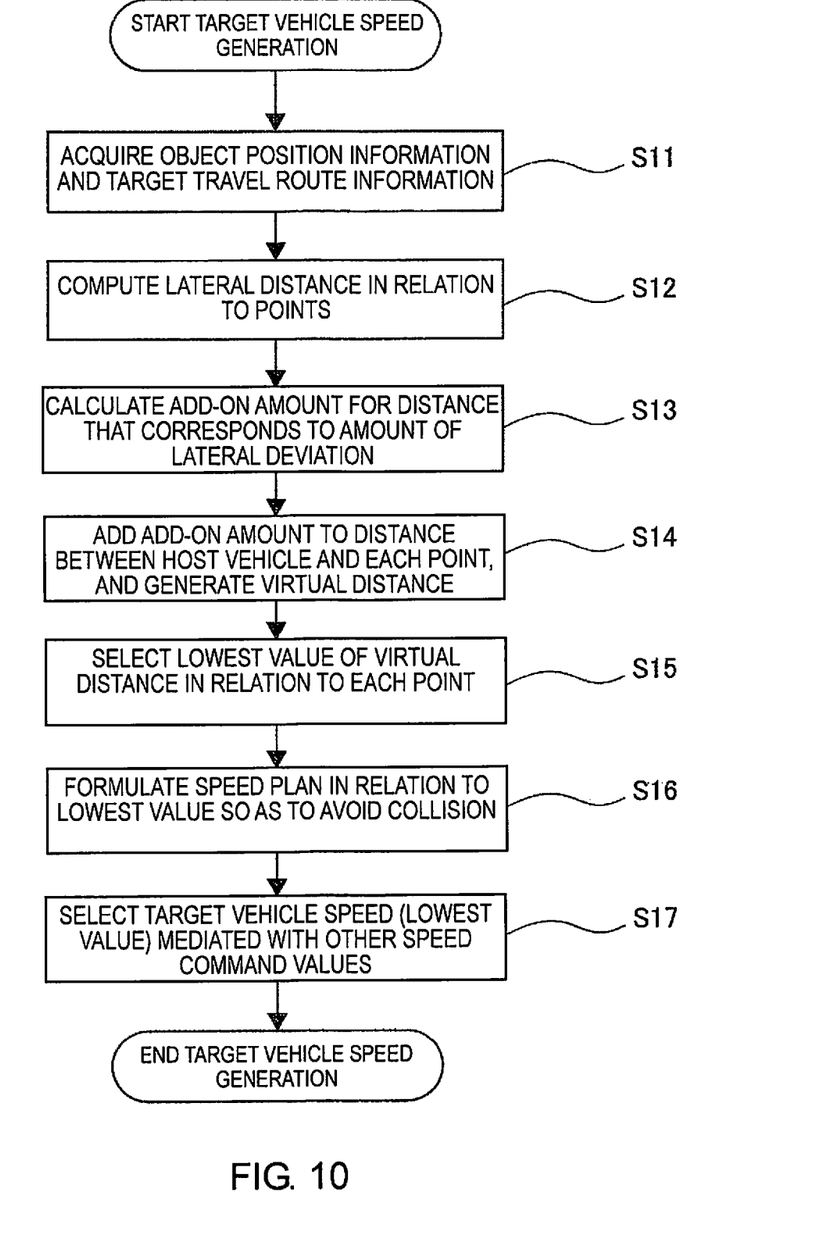
FIG. 10 is a flowchart illustrating a flow of a process for generating a target vehicle speed executed by the autonomous driving control unit in the first embodiment.

FIG. 10 shows a flow of a process for generating a target vehicle speed executed by the autonomous driving control unit 2 in the first embodiment. The steps in FIG. 10 are described below.

In step S11, upon the initiating of generation of a target vehicle speed, object position information and target travel route information are acquired, and the process advances to step S12. The "object position information" is acquired from the peripheral object information acquisition unit 22. The "target travel route information" is acquired from the target travel route generation unit 21.

In step S12, following from the acquisition in step S11 of the object position information and target travel route information, a lateral deviation for each point is computed, and the process advances to step S13. The "computation of a lateral deviation for each point" is computed by the lateral deviation computation unit 232a of the virtual-distance calculation unit 232.

In step S13, following from the computation in step S12 of the lateral deviation for each point, an add-on amount for the frontward distance that corresponds to the amount of lateral deviation is calculated, and the process advances to step S14. The "add-on amount for the frontward distance that corresponds to the amount of lateral deviation" is computed by the add-on amount computation unit 232b of the virtual-distance calculation unit 232.

In step S14, following from the calculation in step S13 of the add-on amount for the distance that corresponds to the amount of lateral deviation, the add-on amount is added to the frontward distance (actual frontward distance) between the host vehicle and each point, a virtual distance is generated, and the process advances to step S15. The "virtual distance" is computed by the virtual-distance computation unit 232c of the virtual-distance calculation unit 232.

In step S15, following from the generation in step S14 of the virtual distances, the lowest value of the virtual distances for each point is selected, and the process advances to step S16. The "selection of the lowest value of the virtual distances for each point" is performed by the shortest-distance computation unit 232d of the virtual-distance calculation unit 232.

In step S16, following from the selection in step S15 of the lowest value of the virtual distances for each point, a vehicle speed plan is formulated in relation to the lowest value so as to avoid collision, and the process advances to step S17. The "formulation of a vehicle speed plan in relation to the lowest value" is performed by the speed command calculation unit 233 (obstacle) of the target vehicle speed generation unit 23.

In step S17, following from the formulation in step S16 of the speed plan in relation to the lowest value, a target vehicle speed is selected (lowest value) according to mediation with other speed command values, and the generation of the target vehicle speed is ended. The "selection of a target vehicle speed according to mediation with other speed command values" is performed by the lowest-speed-command mediation unit 235 of the target vehicle speed generation unit 23.

Thus, when target vehicle speed generation starts, the steps advance in the order of step S11→step S12→step S13→step S14→step S15→step S16→step S17, and then the target vehicle speed generation ends. Specifically, a vehicle speed plan is formulated in consideration of obstacles located toward the front and the side, based on the positional relationship between the host vehicle and the obstacles located toward the front and the side as well as the amount of lateral deviation between the obstacles and the target travel route, thereby making it possible to expand the scenarios in which it is possible to travel at a suitable speed.

Figure 11:
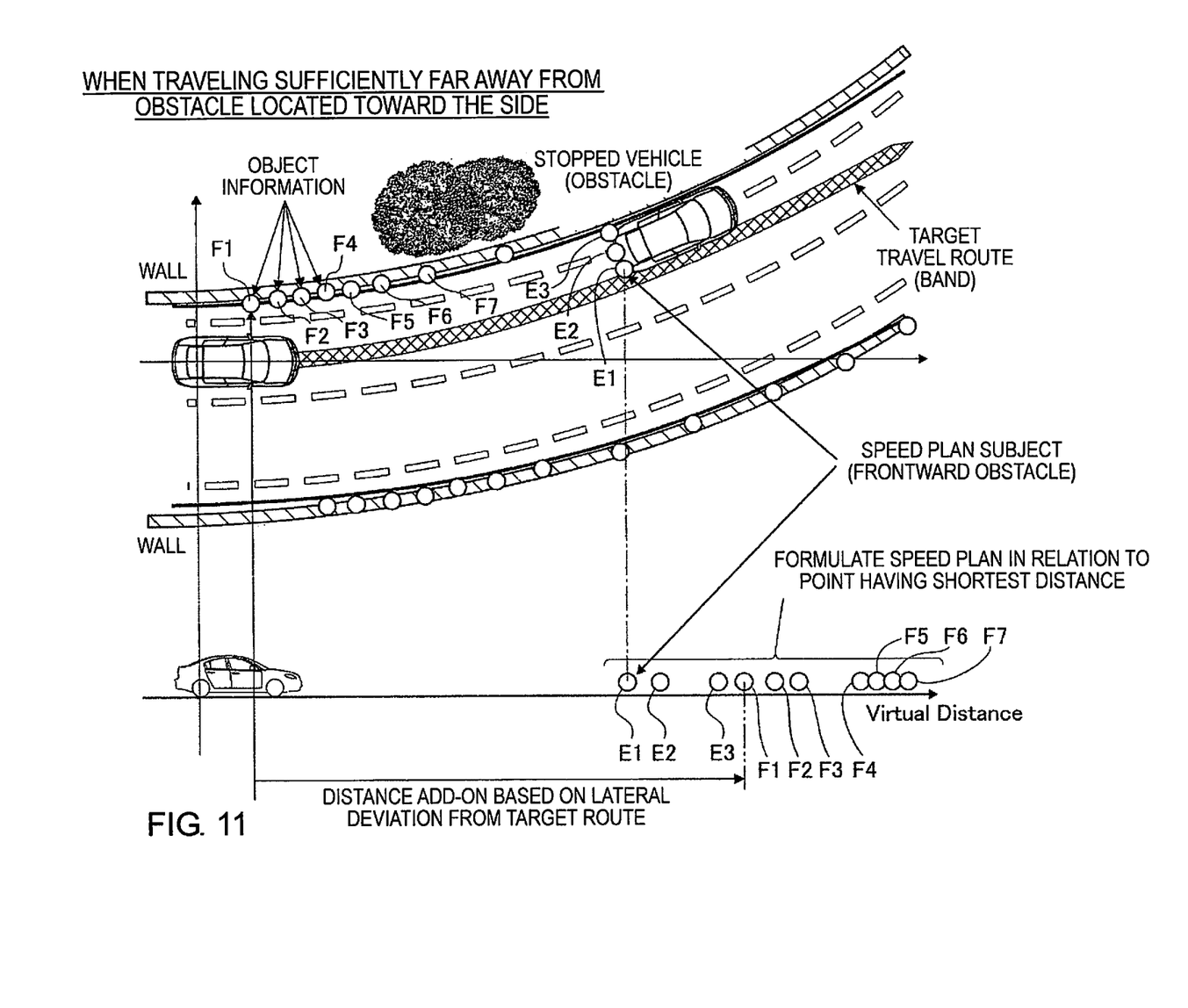
FIG. 11 is an operation schematic diagram illustrating a speed control operation in a case where a host vehicle is traveling sufficiently far away from an obstacle located toward the side when an obstacle is present in front of a travel path of the host vehicle (gently curved road) and a wall (obstacle) is present toward the side of the travel path of the host vehicle in the first embodiment.

Operation for Controlling Speed when Host Vehicle is Traveling Sufficiently Far Away from Obstacle Located Toward the Side FIG. 11 shows a speed control operation in a case where the host vehicle is traveling sufficiently far away from an obstacle located toward the side when an obstacle is present in front of a travel path of the host vehicle (gently curved road) and a wall (obstacle) is present toward the side of the travel path of the host vehicle in the first embodiment. An operation for controlling the speed when the host vehicle is traveling sufficiently far away from an obstacle located toward the side is described below based on FIG. 11.

For a stopped vehicle (obstacle) in front of the host vehicle on the travel path of the host vehicle (gently curved road), a right-rear end point is designated as E1, a center-rear end point is designated as E2, and a left-rear end point is designated as E3. Additionally, for a left wall (obstacle) toward the side of the host vehicle, positions near the host vehicle are designated as points F1, F2, F3, F4, F5, F6, and F7.

At this time, for the right-rear end point E1, the add-on amount for which the amount of lateral deviation is lowest in the virtual distance (i.e., frontward distance plus add-on amount) is reduced, whereby the virtual distance is made substantially equal to the frontward distance. For the center-rear end point E2 and the left-rear end point E3, the add-on amounts increase commensurately with an increase in the amount of lateral deviation from the right-rear end point E1, so that the virtual distances for E1, E2, and E3 have the relationship E1<E2<E3.

For the points F1, F2, F3, F4, F5, F6, and F7 on the left wall (obstacle), the add-on amounts in the virtual distance (i.e., frontward distance plus add-on amount) are approximately constant because the lateral deviations are approximately the same, whereby the virtual distance is made to correspond to the length of the frontward distance. Thus, the virtual distances have the relationship F1<F2<F3<F4<F5<F6<F7.

Because the host vehicle is traveling sufficiently far away from the left wall located toward the side, the amounts of virtual deviation from the points F1, F2, F3, F4, F5, F6, and F7 are large, and the add-on amounts increase. Therefore, the relationship between the virtual distances for all of the points E1, E2, E3, F1, F2, F3, F4, F5, F6, and F7 is E1<E2<E3<F1<F2<F3<F4<F5<F6<F7, as shown in FIG. 11. Thus, the virtual shortest distance is the right-rear end point E1 of the stopped vehicle.

As a result, in a situation where the host vehicle is traveling sufficiently far away from the left wall located toward the side and passengers of the host vehicle do not unnaturally feel that the left wall located toward the side seems to be approaching when the host vehicle passes along the road, there is formulated a vehicle speed plan in which deceleration is not heightened in relation to the right-rear end point E1 of the stopped vehicle. Therefore, deceleration beyond what is necessary does not occur, and it is ensured that the host vehicle will pass by the side of the stopped vehicle through suitably decelerated travel.

Figure 12:
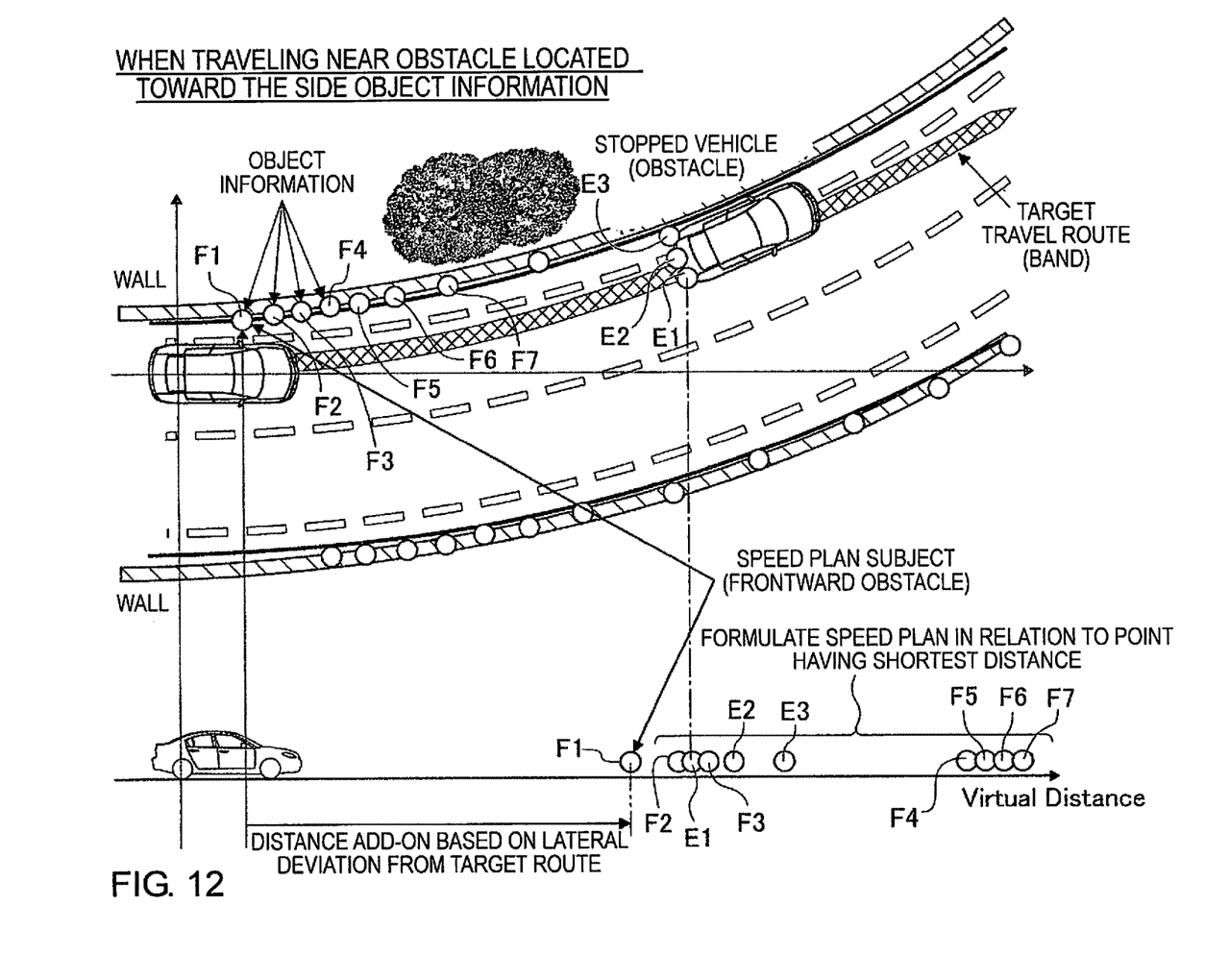
FIG. 12 is an operation schematic diagram illustrating a speed control operation in a case where a host vehicle is traveling near an obstacle located toward the side when an obstacle is present in front of a travel path of the host vehicle (gently curved road) and a wall (obstacle) is present toward the side of the travel path of the host vehicle in the first embodiment.

Operation for Controlling Speed when Host Vehicle is Traveling Near Obstacle Located Toward the Side FIG. 12 shows a speed control operation in a case where the host vehicle is traveling near an obstacle located toward the side when an obstacle is present in front of a travel path of the host vehicle (gently curved road) and a wall (obstacle) is present toward the side of the travel path of the host vehicle in the first embodiment. An operation for controlling the speed when the host vehicle is traveling near the obstacle located toward the side is described below based on FIG. 12.

For a stopped vehicle (obstacle) in front of the host vehicle on the travel path of the host vehicle (gently curved road), a right-rear end point is designated as E1, a center-rear end point is designated as E2, and a left-rear end point is designated as E3. Additionally, for a left wall (obstacle) toward the side of the host vehicle, positions near the host vehicle are designated as points F1, F2, F3, F4, F5, F6, and F7.

At this time, for the right-rear end point E1, the add-on amount for which the amount of lateral deviation is lowest in the virtual distance (i.e., frontward distance plus add-on amount) is reduced, whereby the virtual distance is made substantially equal to the frontward distance. For the center-rear end point E2 and the left-rear end point E3, the add-on amounts increase commensurately with an increase in the amount of lateral deviation from the right-rear end point E1, so that the virtual distances for E1, E2, and E3 have the relationship E1<E2<E3.

For the points F1, F2, F3, F4, F5, F6, and F7 on the left wall (obstacle), the add-on amounts in the virtual distance (i.e., frontward distance plus add-on amount) are approximately constant because the lateral deviations are approximately the same, whereby the virtual distance is made to correspond to the length of the frontward distance. Thus, the virtual distances have the relationship F1<F2<F3<F4<F5<F6<F7.

Because the host vehicle is traveling at a position near the left wall located toward the side, the amounts of virtual deviation from the points F1, F2, F3, F4, F5, F6, and F7 are small, and the add-on amounts decrease. Therefore, the relationship between the virtual distances for all of the points E1, E2, E3, F1, F2, F3, F4, F5, F6, and F7 is F1<F2<E1<F3<E2<E3<F4<F5<F6<F7, as shown in FIG. 12. Thus, the virtual shortest distance is the point F1 at which the distance between the left wall and the host vehicle is shortest.

As a result, in a situation where the host vehicle is traveling near the left wall located toward the side and passengers of the host vehicle do not unnaturally feel that the left wall located toward the side seems to be approaching when the host vehicle passes along the road, there is formulated a vehicle speed plan in which deceleration is not heightened in relation to the point F1 at which the distance between the left wall and the host vehicle is shortest. Therefore, it is ensured that the host vehicle will pass by the side of the stopped vehicle through suitably decelerated travel in which the left wall located toward the side does not seem to approach.

The effects of the invention are described next. In the method and device for generating a target vehicle speed of a driving-assisted vehicle in the first embodiment, the effects listed below are obtained.

(1) A method for generating a target vehicle speed of a driving-assisted vehicle (autonomous driving vehicle), the method involving generating a target vehicle speed of a host vehicle in accordance with an obstacle that hinders travel of the host vehicle. A target travel route of the host vehicle is generated. Position information pertaining to an obstacle on a travel path of the host vehicle, and position information pertaining to an obstacle that is located toward the side and is outside of the travel path of the host vehicle, are acquired. A lateral deviation to the obstacle on the travel path of the host vehicle with respect to the target travel route, and a lateral deviation to the obstacle that is outside of the travel path of the host vehicle with respect to the target travel route, are calculated. A lower target vehicle speed is generated for an obstacle having a lesser lateral deviation than for an obstacle having a greater lateral deviation (FIG. 1). Therefore, it is possible to provide a method for generating a target vehicle speed of a driving-assisted vehicle (autonomous driving vehicle) in which, during travel with driving assistance (autonomous driving), a passenger is prevented from having unpleasant sensations irrespective of whether or not an obstacle is present toward the side of the travel path of the host vehicle. Specifically, it is possible to control the speed with respect to not only an obstacle in a travel lane but also an obstacle toward the side, so that the host vehicle decelerates when an obstacle is present near the side. Thus, considering an obstacle present toward the side of the travel route of the host vehicle makes it possible to formulate a vehicle speed plan that corresponds to an actual travel state.

(2) In generating the target vehicle speed, in relation to an obstacle for which the lateral deviation with respect to the target travel route is equal to or less than a prescribed value, the target vehicle speed is generated according to a speed profile that stops immediately before the obstacle (target vehicle speed generation unit 23; FIG. 4). Therefore, in addition to the effect in (1) above, if obstacles are present on the target travel route and also nearby (within range of a vehicle width), it is possible to achieve a deceleration suitable for the headway distance between the host vehicle and the obstacle and to stop immediately before the obstacle when the obstacle is a stationary object.

(3) In generating the target vehicle speed, an extent of adjustment of the target vehicle speed that corresponds to the lateral deviation from the target travel route is changed according to the frontward distance between the host vehicle and the obstacle, such that, as the frontward distance between the host vehicle and the obstacle decreases, the target vehicle speed is reduced to a greater extent than in the case of a target vehicle speed when the frontward distance between the host vehicle and the obstacle is increasing (target vehicle speed generation unit 23; FIG. 6). Therefore, in addition to the effects in (1) and (2) above, it is possible to control the speed to match the performance of sensors. Specifically, adjustment of the target vehicle speed that corresponds to the lateral deviation is barely used in relation to an obstacle that is far from the host vehicle because precision of a lateral position is low. Conversely, adjustment of the target vehicle speed that corresponds to the lateral deviation is used in relation to an obstacle that is near the host vehicle because the precision of the lateral position is high. This makes it possible to achieve speed control with a higher degree of confidence.

(4) In generating the target vehicle speed, an extent of adjustment of the target vehicle speed that corresponds to the lateral deviation from the target travel route is changed in accordance with a vehicle speed limit of a road, such that in the case of obstacles having the same lateral deviation, the target vehicle speed when the road has a high vehicle speed limit is made to be higher than the target vehicle speed when the road has a low vehicle speed limit (target vehicle speed generation unit 23; FIG. 7). Therefore, in addition to the effects in (1) through (3) above, it is possible to prevent excessive deceleration in travel on high-speed roads, and to prevent insufficient deceleration in travel on metropolitan areas.

(5) In generating the target vehicle speed, a lateral deviation between the target travel route and the obstacle is computed (lateral deviation computation unit 232a), an add-on amount for a frontward distance is computed in accordance with the lateral deviation (add-on amount computation unit 232b), a virtual distance is computed by adding the add-on amount to an actual distance between the obstacle and the host vehicle (virtual distance computation unit 232c), and the target vehicle speed is generated based on the virtual distance (target vehicle speed generation unit 23; FIG. 4). Therefore, in addition to the effects in (1) through (4) above, handling virtual distances makes it possible to facilitate the generation of the target vehicle speed and the controlling of the speed.

(6) In generating the target vehicle speed, an obstacle for which the computed virtual distance in relation to obstacles is the smallest is selected, a virtual shortest distance is computed (shortest-distance computation unit 232d), and the target vehicle speed is generated based on the virtual shortest distance (target vehicle speed generation unit 23; FIG. 2). Therefore, in addition to the effect in (5) above, it is possible to reduce the number of times that the speed is computed and to lower the computation load. Specifically, this is because it is not necessary to generate target vehicle speeds in relation to the virtual distances to the obstacles as computed by the virtual-distance computation unit 232c.

(7) In computing the add-on amount, the add-on amount is increased if the lateral deviation between the target travel route and the obstacle is greater than a prescribed deviation, and the add-on amount is reduced if the lateral deviation is less than the prescribed deviation (add-on amount computation unit 232b; FIG. 6). Therefore, in addition to the effect in (5) or (6) above, it is possible to prioritize according to the magnitude of the lateral deviations in relation to the obstacles. In addition, it is possible to adjust the amount of deceleration according to an add-on amount map in relation to the lateral deviation.

(8) In computing the add-on amount, the add-on amount is set to zero when the lateral deviation between the target travel route and the obstacle is equal to or less than a fixed value (add-on amount computation unit 232b; FIG. 6). Therefore, in addition to the effects in (5) through (7) above, it is possible to come to a full stop immediately before the obstacle in consideration of the vehicle width plus extra space.

(9) In computing the add-on amount, the add-on amount is changed in accordance with the vehicle speed limit of the road, such that the add-on amount is increased on roads having high vehicle speed limits, and the add-on amount is reduced on roads having low vehicle speed limits (add-on amount computation unit 232b; FIG. 7). Therefore, in addition to the effects in (5) through (8) above, it is possible to prevent excessive deceleration during travel on high-speed roads, and to prevent insufficient deceleration during travel in metropolitan areas.

(10) In computing the add-on amount, the add-on amount is changed in accordance with the frontward distance from the host vehicle, such that the add-on amount is reduced when the obstacle is at a short distance from the host vehicle, and the add-on amount is increased as the frontward distance between the host vehicle and the obstacle increases (add-on amount computation unit 232b; FIG. 6). Therefore, in addition to the effects in (5) through (9) above, it is possible to control the speed to match the performance of sensors. Specifically, adjustment of the target vehicle speed that corresponds to the lateral deviation is barely used in relation to an obstacle that is far from the host vehicle because precision of a lateral position is low. Conversely, adjustment of the target vehicle speed that corresponds to the lateral deviation is used in relation to an obstacle that is near the host vehicle because the precision of the lateral position is high. This makes it possible to achieve speed control with a higher degree of confidence.

(11) A device for generating a target vehicle speed of a driving-assisted vehicle (autonomous driving vehicle) equipped with a controller (autonomous driving control unit 2) for generating a target vehicle speed of a host vehicle in accordance with an obstacle that hinders travel of the host vehicle, wherein the controller (autonomous driving control unit 2) comprises a target travel route generation unit 21, a peripheral object information acquisition unit 22, and a target vehicle speed generation unit 23. The target travel route generation unit 21 generates a target travel route of the host vehicle. The peripheral object information acquisition unit 22 acquires position information pertaining to an obstacle on a travel path of the host vehicle, and position information pertaining to an obstacle that is located toward the side and is outside of the travel path of the host vehicle. The target vehicle speed generation unit 23 calculates a lateral deviation to the obstacle on the travel path of the host vehicle with respect to the target travel route, calculates a lateral deviation to the obstacle that is outside of the travel path of the host vehicle with respect to the target travel route, and generates a lower target vehicle speed for an obstacle having a lesser lateral deviation than for an obstacle having a greater lateral deviation (FIG. 1). Therefore, it is possible to provide a device for generating a target vehicle speed of a driving-assisted vehicle (autonomous driving vehicle) in which, during travel with driving assistance (autonomous driving), a passenger is prevented from having unpleasant sensations irrespective of whether or not an obstacle is present toward the side of the travel path of the host vehicle.

In the foregoing, a device for generating a target vehicle speed of a driving-assisted vehicle of the present disclosure was described with reference to the first embodiment. However, the specific configuration thereof is not limited to that of the first embodiment; design modifications, additions, etc., are possible without departing from the spirit of the invention as set forth in the accompanying claims.

In the first embodiment, a stopped vehicle that is stopped on the travel route of the host vehicle was cited as an example of an obstacle on the travel path of the host vehicle. However, obstacles on the travel path of the host vehicle also include installations placed on the travel path of the host vehicle, vehicles traveling slowly in the same lane as the host vehicle, etc. In the first embodiment, a wall installed along the travel route of the host vehicle was cited as an example of an obstacle that is outside of the travel path of the host vehicle. However, obstacles that are outside of the travel path of the host vehicle also include median strips, vehicles traveling in an oncoming lane relative to the host vehicle, etc.

In the first embodiment, the target vehicle speed generation unit 23 was described as comprising a virtual-distance calculation unit 232 that has a lateral deviation computation unit 232a, an add-on amount computation unit 232b, and a virtual-distance computation unit 232c. However, another example of the target vehicle speed generation unit does not comprise a virtual-distance calculation unit, but rather uses a computation element other than virtual distance and generates a lower target vehicle speed for an obstacle having a lesser lateral deviation than for an obstacle having a greater lateral deviation.

In the first embodiment, the method and device for generating a target vehicle speed according to the present disclosure are applied to an autonomous driving vehicle in which steering/drive/braking are autonomously controlled through selection of an autonomous driving mode. However, the method and device for generating a target vehicle speed according to the present disclosure can also be applied to vehicles in which a target vehicle speed is used to support driving of a driver, such as a driving-assisted vehicle that supports driving of a driver by displaying a target vehicle speed, or a driving-assisted vehicle equipped only with an ACC.

The invention claimed is:

1. A target vehicle speed generation method for generating a target vehicle speed of a host vehicle in accordance with a selected obstacle that hinders travel of the host vehicle, the target vehicle speed generation method is comprising:
   generating a target travel route of the host vehicle;
   acquiring position information pertaining to a plurality of obstacles with respect to the target travel route;
   calculating a plurality of lateral deviations, each of the lateral deviations being a deviation of one the plurality of obstacles with respect to the target travel route;
   computing an add-on amount in accordance with a magnitude of each of the lateral deviations,
   computing a virtual distance with respect to each of the plurality of obstacles by adding the add-on amount corresponding to the obstacle to a frontward distance between the host vehicle and the obstacle;
   selecting one obstacle among the plurality of obstacles for which the computed virtual distance is the smallest as the selected obstacle, the virtual distance with respect to the selected obstacle being a virtual shortest distance, and generating the target vehicle speed based on the virtual shortest distance; and
   outputting the target vehicle speed to a control unit configured to execute a drive control of the host vehicle based on the target vehicle speed.

2. The target vehicle speed generation method according to claim 1, wherein
   during generation of the target vehicle speed, when the lateral deviation corresponding to the selected obstacle is equal to or less than a prescribed value and the selected obstacle is within a range of a vehicle width, the target vehicle speed is generated according to a vehicle speed profile that stops immediately before the obstacle.

3. The target vehicle speed generation method according to claim 1, wherein
   during generation of the target vehicle speed, an extent of adjustment of the target vehicle speed that corresponds to the lateral deviation of the selected obstacle is changed according to a frontward distance between the host vehicle and the selected obstacle, such that, as the frontward distance between the host vehicle and the selected obstacle decreases, the target vehicle speed is reduced to a greater extent than in a case of the target vehicle speed when the frontward distance between the host vehicle and the selected obstacle is increasing.

4. The target vehicle speed generation method according to claim 1, wherein
   during generation of the target vehicle speed, an extent of adjustment of the target vehicle speed that corresponds to the lateral deviation of the selected obstacle is changed in accordance with a vehicle speed limit of a road on which the host vehicle travels such that the target vehicle speed is made to be higher when the road has a high vehicle speed limit than when the road has a low vehicle speed limit.

5. The target vehicle speed generation method according to claim 1, wherein
   the add-on amount increases correspondingly to an increase in the respective lateral deviation.

6. The target vehicle speed generation method according to claim 1, wherein
   during computation of the add-on amount corresponding to each of the plurality of obstacles, the add-on amount is computed to be larger when the lateral deviation is greater than a prescribed deviation and smaller when the lateral deviation is less than the prescribed deviation.

7. The target vehicle speed generation method according to claim 1 wherein
   during computation of the add-on amount corresponding to each of the plurality of obstacles, the add-on amount is set to zero when the lateral deviation is equal to or less than a fixed value.

8. The target vehicle speed generation method according to claim 1 wherein
   during computation of the add-on amount corresponding to each of the plurality of obstacles, the add-on amount is changed in accordance with a vehicle speed limit of a road on which the host vehicle travels such that the add-on amount is increased when the road has a high vehicle speed limit and reduced when the road has a low vehicle speed limit.

9. The target vehicle speed generation method according to claim 1, wherein
   during computation of the add-on amount corresponding to each of the plurality of obstacles, the add-on amount is changed in accordance with the frontward distance such that the add-on amount is reduced when the frontward distance is small and the add-on amount is increased as the frontward distance increases.

10. A target vehicle speed generation device for a host vehicle, the target vehicle speed generation device comprising:
    a controller for generating a target vehicle speed of the host vehicle in accordance with a selected obstacle that hinders travel of the host vehicle,
    the controller comprising: being configured to
    generate a target travel route of the host vehicle,
    acquire position information pertaining to the plurality of obstacles with respect to the target travel route,
    calculate a plurality of lateral deviations, each of the lateral deviations being a deviation of one of the plurality of obstacles with respect to the target travel route,
    compute an add-on amount in accordance with a magnitude of each of the lateral deviations,
    compute a virtual distance with respect to each of the plurality of obstacles by adding the add-on amount corresponding to the obstacle to a frontward distance between the host vehicle and the obstacle,
    select one obstacle among the plurality of obstacles for which the computed virtual distance is the smallest as the selected obstacle, the virtual distance with respect to the selected obstacle being a virtual shortest distance, and generate the target vehicle speed based on the virtual shortest distance,
    output the target vehicle speed to a control unit configured to execute a drive control of the host vehicle based on the target vehicle speed.

* * * * *